US009482365B2

(12) United States Patent
Miller, III et al.

(10) Patent No.: US 9,482,365 B2
(45) Date of Patent: Nov. 1, 2016

(54) ROTARY VALVE

(71) Applicant: Parker-Hannifin Corporation, Cleveland, OH (US)

(72) Inventors: John Allen Miller, III, Avon Lake, OH (US); Dennis L. Reynolds, Fort Wayne, IN (US); Brian Slattery, Hicksville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 68 days.

(21) Appl. No.: 14/378,001

(22) PCT Filed: Feb. 11, 2013

(86) PCT No.: PCT/US2013/025558
§ 371 (c)(1),
(2) Date: Aug. 11, 2014

(87) PCT Pub. No.: WO2013/120068
PCT Pub. Date: Aug. 15, 2013

(65) Prior Publication Data
US 2015/0059900 A1   Mar. 5, 2015

Related U.S. Application Data

(60) Provisional application No. 61/597,220, filed on Feb. 10, 2012.

(51) Int. Cl.
*F16K 11/074*   (2006.01)
*F16K 39/04*   (2006.01)
(Continued)

(52) U.S. Cl.
CPC ............ *F16K 39/045* (2013.01); *F16K 3/262* (2013.01); *F16K 5/0407* (2013.01);
(Continued)

(58) Field of Classification Search
CPC .... F16K 5/0407; F16K 5/0464; F16K 3/262; F16K 31/003; F16K 39/06; F16K 39/045; F16K 11/0853; Y10T 137/86935

USPC ............. 137/625.21, 876, 625.46, 625.47; 251/283
See application file for complete search history.

(56) References Cited

U.S. PATENT DOCUMENTS 1,342,900 A * 6/1920 McGillivray ........... F16K 39/06
137/625.22
2,799,470 A * 7/1957 Margrave .............. F16K 5/0464
251/172

(Continued)

FOREIGN PATENT DOCUMENTS

BE        355 301      10/1928
DE      32 29 682       2/1984

(Continued)

OTHER PUBLICATIONS

International Search Report for corresponding patent application No. PCT/US2013/025558 dated Jul. 31, 2013.

(Continued)

*Primary Examiner* — Marina Tietjen
*Assistant Examiner* — Umashankar Venkatesan
(74) *Attorney, Agent, or Firm* — Renner, Otto, Boisselle & Sklar, LLP

(57) ABSTRACT

A rotary valve capable of high flow rates, minimal pressure drop, and rapid actuation is presented. According to one aspect, the rotary valve is characterized by a unique pressure balancing system operating on the rotary spool of the valve to reduce side force caused by pressure at the flow ports. According to another aspect, the rotary valve (700) is characterized by a internal shiftable blocking spool (790) in response to a failure condition or a modulating signal. According to another aspect, an interface is provided for sealing a port of a rotary valve to an outer surface of a rotary spool. According to another aspect, the rotary valve is characterized by an interface provided for sealing a port to an outer surface of the rotary spool. According to another aspect, a rotary valve is characterized by a three-way three-or-more-position configuration. According to another aspect, a rotary valve is characterized by a four-port three-position configuration.

20 Claims, 15 Drawing Sheets

(51) Int. Cl.
*F16K 39/06* (2006.01)
*F16K 3/26* (2006.01)
*F16K 5/04* (2006.01)
*F16K 11/085* (2006.01)
*F16K 31/00* (2006.01)

(52) U.S. Cl.
CPC ........ *F16K 5/0464* (2013.01); *F16K 11/0853* (2013.01); *F16K 31/003* (2013.01); *F16K 39/06* (2013.01); *Y10T 137/86936* (2015.04)

(56) References Cited

U.S. PATENT DOCUMENTS

| | | | |
|---|---|---|---|
| 3,213,888 | A | 10/1965 | Cameron et al. |
| 3,430,919 | A * | 3/1969 | Frazier .................. F16K 5/0471 251/283 |
| 4,061,158 | A | 12/1977 | Musial |
| 4,658,859 | A | 4/1987 | Backe et al. |
| 8,967,199 | B2 * | 3/2015 | Blieske .................. F16K 39/06 137/625.21 |
| 2006/0218908 | A1 | 10/2006 | Abou-Raphael |
| 2007/0102997 | A1 | 5/2007 | Cayer |
| 2009/0065724 | A1 | 3/2009 | Mitton et al. |

FOREIGN PATENT DOCUMENTS

| | | |
|---|---|---|
| DE | 37 30 419 | 3/1989 |
| EP | 0 240 059 | 10/1987 |
| EP | 0 515 965 | 12/1992 |
| FR | 1 222 752 | 6/1960 |
| FR | 1 378 996 | 11/1964 |
| GB | 139 404 | 3/1920 |
| GB | 621 237 | 4/1949 |
| GB | 1 356 488 | 6/1974 |
| GB | 2 344 152 | 5/2000 |

OTHER PUBLICATIONS

International Preliminary Report on Patentability for corresponding patent application No. PCT/US2013/025558 dated May 28, 2014.

* cited by examiner

ROTARY VALVE

RELATED APPLICATIONS

This application is a national phase of International Application No. PCT/US2013/025558 filed on Feb. 11, 2013 and published in the English language, which claims the benefit of U.S. Provisional Application No. 61/597,220 filed Feb. 10, 2012, which is hereby incorporated herein by reference.

FIELD OF INVENTION

The present invention relates generally to rotary valves, and more particularly to radially-ported rotary valves.

BACKGROUND

Compressed Air Energy Storage (CAES) is a way to store energy generated at one time for use at another time. At utility scale, energy generated during periods of low energy demand (off-peak) can be released to meet higher demand (peak load) periods. The storage vessel is often an underground cavern created by solution mining (salt is dissolved in water for extraction) or by utilizing an abandoned mine.

Large compression systems have been and are being developed to operate these storage/generation facilities. The compression systems in many cases are operated by hydraulic power and require high operating volumes of hydraulic fluid, a long life, and low leakage. These hydraulic systems would use hydraulic valving capable of handling this high volume of fluid flow with rapid actuation speeds.

SUMMARY OF INVENTION

The present invention provides a rotary valve capable of high flow rates, minimal pressure drop, and rapid actuation. The valves presented herein can be applied to a very large number of applications and can be scaled to any size.

According to one aspect of the invention, the rotary valve is characterized by a unique pressure balancing system operating on the rotary spool of the valve to reduce side force caused by pressure at the flow ports.

In particular, the rotary valve includes a housing having a cavity and a rotary spool positioned within and rotatably movable in the cavity of the housing about a rotation axis. The spool has a fluid passageway extending through the spool between first and second openings at an outer radial surface of the spool. The housing includes first and second flow ports opening to the cavity at radially spaced apart locations that respectively will align with the first and second openings at the outer radial surface of the spool at a first rotated position of the rotary spool. A first balancing port opens to the cavity at a side of the cavity radially opposite the first flow port. A balancing passageway communicates fluid pressure from the first flow port to the first balancing port.

Optionally, the rotary valve includes comprising a second balancing port opening to the cavity at a side of the cavity radially opposite the first flow port.

Optionally, the first and second balancing ports are directly opposite the first flow port and are axially offset from the first flow port and have a combined opening area approximately equal to the opening area of the first flow port.

Optionally, the housing has four flow ports and the rotary spool is moveable to a first position to create a fluid passageway between the first flow port and the second flow port, a second position to create a fluid passageway between a third flow port and a fourth flow port, and a third position blocking flow through the valve.

Optionally, the first balancing port is directly radially opposite the first flow port.

Optionally, the flow ports are formed perpendicular to a central axis of the cylindrical cavity.

Optionally, the balancing passageway is contained within the housing and fluidly connects the first flow port to the first balancing port.

According to another aspect of the invention, the rotary valve is characterized by a unique internal shiftable blocking spool in response to a failure condition or a modulating signal.

In particular, the rotary valve includes a housing having a cavity; a rotary spool positioned within and rotatably movable in the cavity of the housing about a rotation axis, the spool having a fluid passageway extending through the spool between first and second openings at an outer radial surface of the spool; and a second spool movable with respect to the rotary spool for restricting flow through the fluid passageway of the rotary spool. The housing includes first and second flow ports opening to the cavity at radially spaced apart locations that respectively will align with the first and second openings at the outer radial surface of the spool at a first rotated position of the rotary spool.

Optionally, the second spool is positioned in a bore through the rotary spool, intersects the fluid passageway, is movable within the bore.

Optionally, the second spool is configured to restrict flow through the fluid passageway in a first position and to not restrict flow through the fluid passageway in a second position.

Optionally, the second spool completely blocks flow through the fluid passageway when in the first position.

Optionally, the second spool is biased towards the first position.

Optionally, the second spool is axially moveable within the bore for selectively opening and closing the passageway.

Optionally, the axis of the bore and the second spool are perpendicular to the fluid passageway of the rotary spool.

Optionally, the bore and the second spool are axially disposed within the rotary spool.

According to another aspect of the invention, a unique interface is provided for sealing a port of a rotary valve to an outer surface of a rotary spool.

In particular, a seal for sealing includes a seal member having a central bore defining a fluid passageway along a flow axis, and having a sealing face for sealing against a rotary valve spool. The sealing face is concave along an axis perpendicular to the flow axis and thereby complimentary to an outer radial surface of the rotary spool.

Optionally, the seal is pressure balanced.

Optionally, the seal member is configured to produce a biasing force in a direction towards the sealing face when subject to pressurized fluid.

Optionally, the seal further includes a biasing element configured to bias the seal member in a direction towards the sealing face.

Optionally, the seal member is metal or a composite material.

According to another aspect of the invention, the rotary valve is characterized by a unique interface provided for sealing a port to an outer surface of the rotary spool.

In particular, the rotary valve includes a housing having a cavity; a rotary spool positioned within and rotatably movable in the cavity of the housing about a rotation axis, the spool having a fluid passageway extending through the spool between first and second openings at an outer radial surface of the spool; and a seal member having a fluid passageway along a flow axis, the seal member coaxial with and disposed in the first flow port and having a sealing face for sealing against the rotary spool. The housing includes first and second flow ports opening to the cavity at radially spaced apart locations that respectively will align with the first and second openings at the outer radial surface of the spool at a first rotated position of the rotary spool. The sealing face is concave along and concentric with the rotation axis of the rotary spool and thereby complimentary to an outer radial surface of the rotary spool.

Optionally, the seal member is pressure balanced.

Optionally, the seal member floats with respect to the housing.

Optionally, the seal member is configured to produce a biasing force in a direction towards the sealing face when subject to pressurized fluid.

Optionally, the rotary valve includes a biasing element configured to bias the seal member against the rotary spool.

Optionally, the seal member and the rotary spool form a metal-to-metal seal.

Optionally, the housing includes a passageway configured to communicate fluid pressure from the first flow port to a first balancing port opening to radially opposite side of the housing cavity from the first flow port; and the rotary valve further including a second seal member having a fluid passageway along a flow axis, the second seal member coaxial with and disposed in the first balancing port and having a sealing face for sealing against the rotary spool. The sealing face is concave along and concentric with the rotation axis of the rotary spool and thereby complimentary to the outer radial surface of the rotary spool.

Optionally, the rotary valve includes a second balancing port radially opposite the first flow port, and wherein the first and second balancing ports are axially offset from the first flow port and have a combined opening area approximately equal to the opening area of the first flow port; the rotary valve further including a third seal member having a fluid passageway along a flow axis, the third seal member coaxial with and disposed in the second balancing port and having a sealing face for sealing against the rotary spool. The sealing face is concave along and concentric with the rotation axis of the rotary spool and thereby complimentary to the outer radial surface of the rotary spool According to another aspect of the invention, a rotary valve is characterized by a unique three-way three-or-more-position configuration.

In particular, the rotary valve includes a housing having a cavity; and a rotary spool positioned within and rotatably movable in the cavity of the housing about a rotation axis, the spool having a fluid passageway extending through the spool between first and second openings at an outer radial surface of the spool. The housing includes first, second, and third flow ports opening to the cavity at radially spaced apart locations. The rotary spool is movable between three positions, and wherein, in the first position, the rotary spool connects the first and second flow ports, in the second position, the rotary spool connects the second and third flow ports, and in the third position, the rotary spool disconnects the flow ports from each other.

Optionally, in a fourth position, the rotary spool connects the third and first flow ports.

According to another aspect of the invention, a rotary valve is characterized by a unique four-port three-position configuration.

In particular, the rotary valve includes a housing having a cavity; and a rotary spool positioned within and rotatably movable in the cavity of the housing about a rotation axis, the spool having a fluid passageway extending through the spool between first and second openings at an outer radial surface of the spool. The housing includes first, second, third, and fourth flow ports opening to the cavity at radially spaced apart locations. The rotary spool is movable between three positions, and wherein, in the first position, the rotary spool connects the first and third flow ports, in the second position, the rotary spool connects the second and fourth flow ports, and in the third position, the rotary spool disconnects the flow ports from each other.

The foregoing and other features of the invention are hereinafter described in greater detail with reference to the accompanying drawings.

DETAILED DESCRIPTION

A radially-ported rotary valve includes a central rotary spool that commutes flow therethrough between radially disposed stationary ports in a valve body or housing. Traditional rotary valves include spools that connect two ports together or, positioned between the ports, blocks the two ports from fluid communication.

Figure 1A:
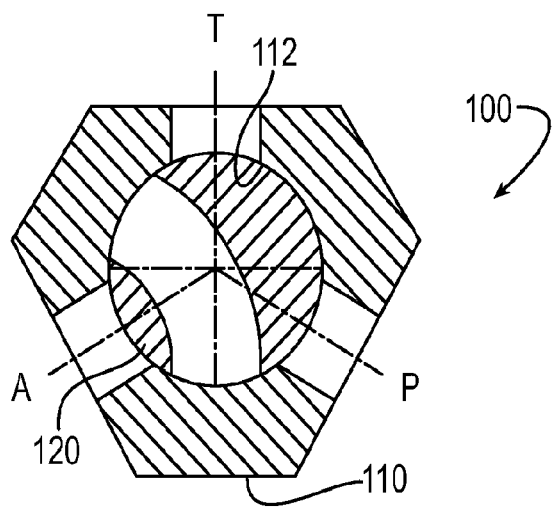
FIG. 1A shows a cross-section of an exemplary three-way rotary valve in one position.
Figure 1B:
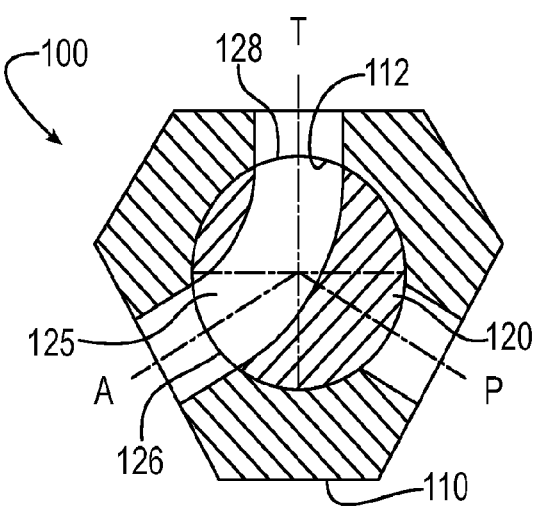
FIG. 1B shows a cross-section of the exemplary three-way rotary valve in another position.
Figure 1C:
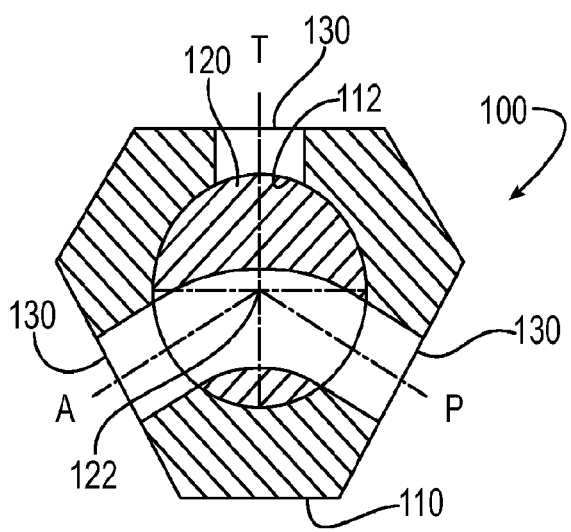
FIG. 1C shows a cross-section of the exemplary three-way rotary valve in yet another position.

Referring initially to FIGS. 1A-1C, shown is a 3 (or 4) position 3 way valve 100 having a valve housing 110 including a cavity 112. A rotary spool 120 is positioned within and rotatably movable in the cavity of the housing about a rotation axis 122. The spool 120 has a fluid passageway 125 extending through the spool between first and second openings 126, 128 at an outer radial surface of the spool. The fluid passageway may include a sharp or a gradual (as shown) curve.

The housing 110 may include a plurality of flow ports 130 opening to the cavity 112 at radially spaced apart locations. In an exemplary embodiment, there are three flow ports 130. Optionally, the flow ports 130 are equally spaced about the cavity 112. The flow port 130 labeled "A" is the work port, the flow port 130 labeled "T" is the tank port, and the flow port labeled "P" is the supply pressure port. The function of the flow ports illustrated herein have been labeled for illustrative purposes, port hydraulic functions are not limited in any functional way.

By selectively positioning the rotary spool 120, the work port can be connected via the fluid passageway 125 to one of the two service ports (supply pressure port, or tank port), or all flow ports 130 may be blocked by positioning the rotary spool 120 passageway 125 between any of the flow ports 130. Furthermore, although not useful in all applications, the supply pressure port may also be connected to the tank port. Moreover, other configurations including any number of ports and inter-connections through the rotor are possible regardless of port function.

Figure 2A:
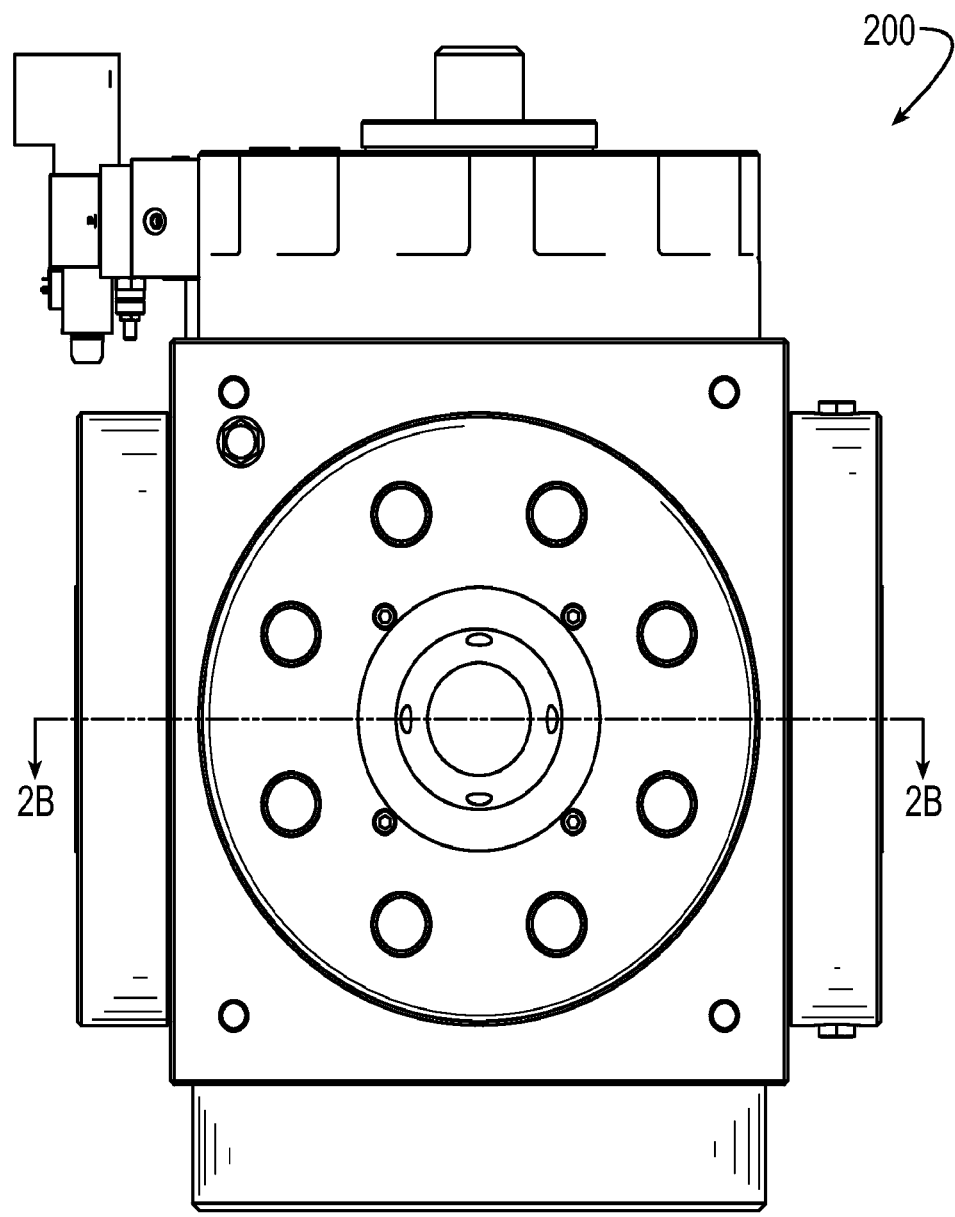
FIG. 2A shows an exterior view of an exemplary four-port rotary valve.
Figure 2B:
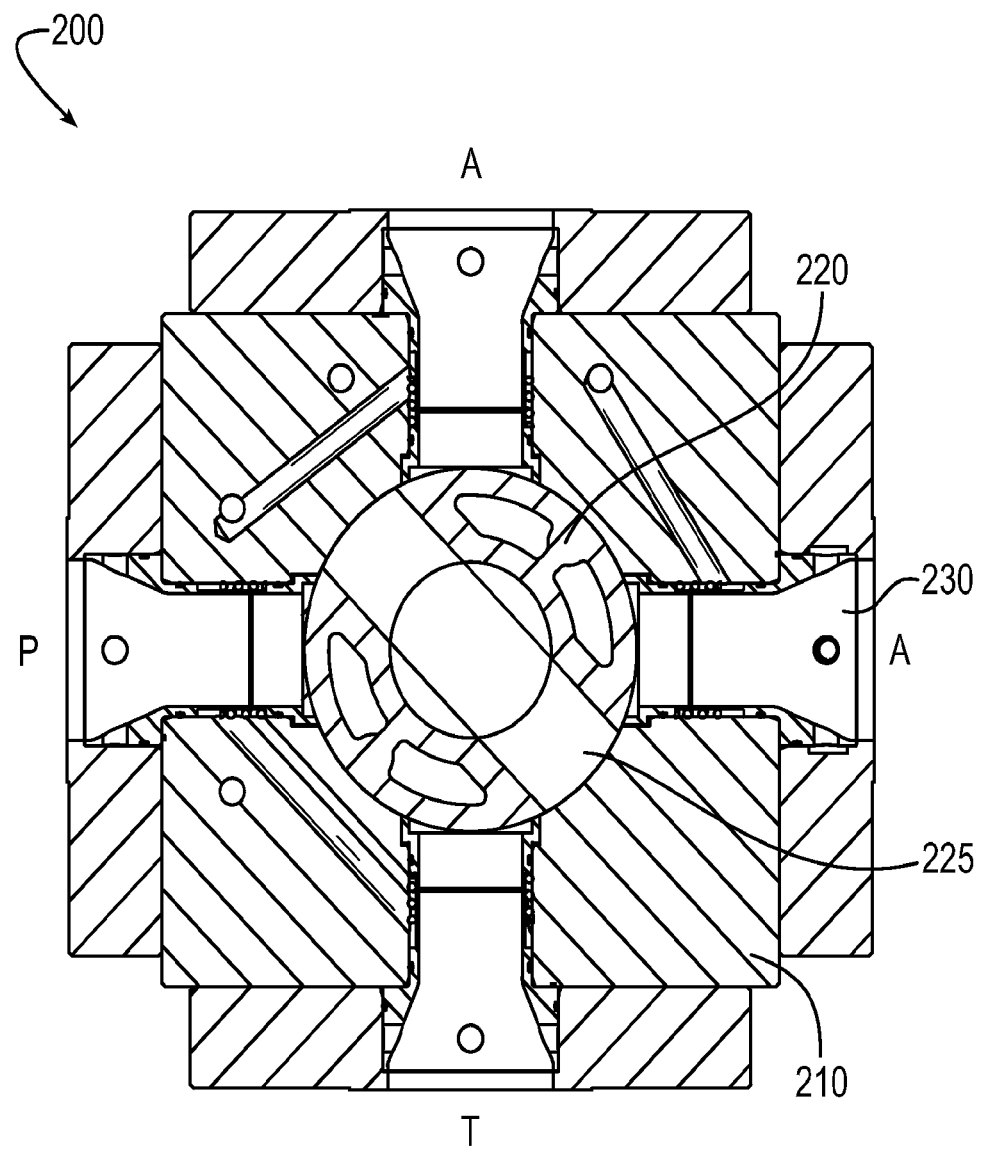
FIG. 2B shows a cross-section of the exemplary four-port rotary valve.

Turning now to FIGS. 2A and 2B, an exemplary embodiment of the rotary valve is shown at 200. The rotary valve 200 is substantially the same as the above-referenced rotary valve 100, and consequently the same reference numerals but indexed by 100 are used to denote structures corresponding to similar structures in the rotary valve. In addition, the foregoing description of the rotary valve 100 is equally applicable to the rotary valve 200 except as noted below. Moreover, it will be appreciated upon reading and understanding the specification that aspects of the rotary valves may be substituted for one another or used in conjunction with one another where applicable.

The rotary valve 200 includes a fourth flow port 220 opening to the cavity 212. Although the four flow ports may be spaced as desired, an exemplary embodiment includes the four flow ports equally spaced at ninety degree intervals. In the exemplary embodiment, the fluid passageway 225 is straight, resulting in very little pressure drop across the valve 200. Such a configuration results in a three-position valve. Specifically, the rotary spool 220 is movable between three positions. In the first position, the rotary spool 220 connects the first and third flow ports, in the second position, the rotary spool connects the second and fourth flow ports, and in the third position, the rotary spool disconnects the flow ports from each other. The two flow ports 230 labeled "A" are common work ports. By positioning the rotary spool 220, the work port(s) can be connected to one of two service ports—herein shown as P (supply pressure), T (tank port)—or all ports may be blocked by positioning the fluid passageway 225 between any of the flow ports 230.

This four port, three position configuration as described allows for a 'straight through' fluid passageway. This feature provides for the lowest pressure drop possible, because there are no turns or impingement points in the valve connecting any combination of ports.

Figure 2C:
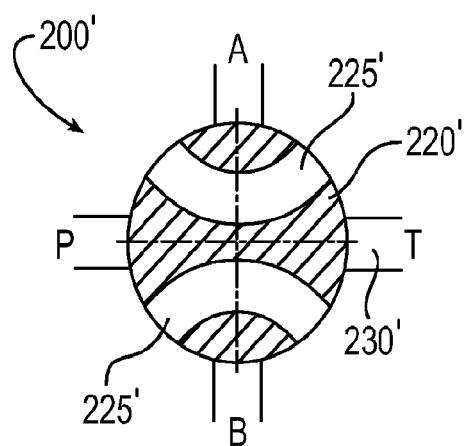
FIG. 2C shows a schematic view of another exemplary four-port rotary valve.
Figure 2D:
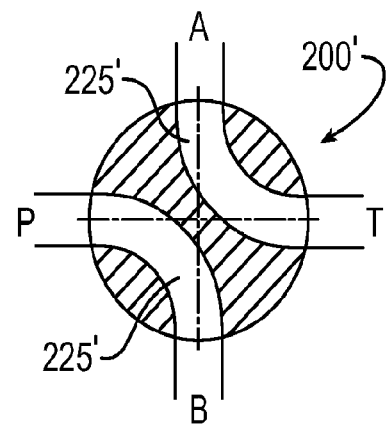
FIG. 2D shows another schematic view of an exemplary four-port rotary valve.
Figure 2E:
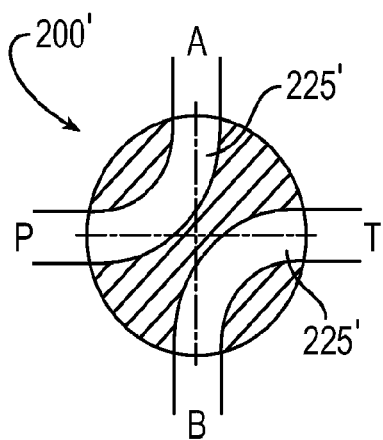
FIG. 2E shows another schematic view of an exemplary four-port rotary valve.

FIGS. 2C-2E show another exemplary rotary valve. The rotary valve 200' is substantially the same as the above-referenced rotary valve 200, and consequently the same reference numerals but with prime notation are used to denote structures corresponding to similar structures in the rotary valve. In addition, the foregoing description of the rotary valve 200 is equally applicable to the rotary valve 200' except as noted below. Moreover, it will be appreciated upon reading and understanding the specification that aspects of the rotary valves may be substituted for one another or used in conjunction with one another where applicable.

The rotary valve 200' includes first and second fluid passages 225' allowing the valve to connect, for example, a first work port (A) to tank (T) while simultaneously connecting the pressure supply port (P) to a second work port (B) in a first position. In a second position, A is connected to P while B is connected to T. Finally, in a third position, all flow ports are disconnected from each other.

An additional feature of the (4 ported) rotary valve described above is that in an application where the valve is required to cycle through a repetitive sequence of port connections where the flow ports can be arranged around the valve housing in the desired sequence. Such a valve can be continuously sequenced by positioning the rotary spool in a constant clockwise or counterclockwise direction without the need to reverse. This feature would prevent the generation of non-continuous wear in the rotor or body by any incorporated seals at the flow ports (for example, the floating pressure balanced seal rings, to be described later in this document). In applications where the valve positioning sequence is mostly a repeating sequence, the generation of these non-continuous wear grooves may not present an issue, but if during use the rotary spool is positioned over the end of such a groove, damage or excessive wear could be produced as well as an increase in seal leakage when the 'worn-in' seal is positioned over an unused portion of the rotary spool.

The flexibility of the above-described rotary valves allows any number of possible actuators to be attached to the rotary valve itself, including but not limited to electric, pneumatic, or hydraulic motors, manual operators, rotary actuators—all with the optional addition of gear boxes or leverage systems.

Actuation systems which operate the rotary valve can be configured as open loop where the valve operation and rotor position is limited (controlled) by physical stops in the valve, actuator, or gearbox mechanisms directly or by addition of additional mechanisms, or by manual means. Additionally the rotary spool position can be controlled within a closed loop system by a controller where the spool position is monitored and the actuator is controlled to position the spool to the desired spool position. Optionally, speed, acceleration, and jerk can also be controlled by said controller. In addition to controlling the spool position and motion performance, monitoring feedback either derived from the feedback means itself or separately by alternate position monitoring devices can be employed in practice to provide valve position status to a user's machine control system. Both the feedback for position control and optional said alternate position monitoring devices can be continuous or simply on/off. An exemplary embodiment would include a rotary continuous position transducer for closed loop positioning of the rotor, combined with proximity switches to be provided to the machine control user for process monitoring.

If port pressures where equal and symmetrically opposing across the rotary spool diameter while exerting over the same surface areas, then the resultant forces on the rotor would be balanced, but in use this would not be the case. Therefore, these potentially very large imbalanced forces would produce high frictional resistance to actuation, produce accelerated surface wear, or require very large bearings to support, or all mentioned.

Consider a single radial port with its associated area exposed to the rotary spool. By hydraulically connecting this port to an equal balancing area symmetrically disposed on the opposite side of the spool, the two opposite areas exposed to the same pressure will balance out with no reaction force on the spool. It is important to note that this balancing area may be symmetrically positioned to balance the opposing force across the rotor diameter, and additionally, this balancing area may be symmetrically disposed along the spool rotation axis as well. This balancing means can be used to balance any number of radial ports and result in a valve that does not require large (and/or many) bearings needed to support the rotary spool in the valve housing.

Figure 3A:
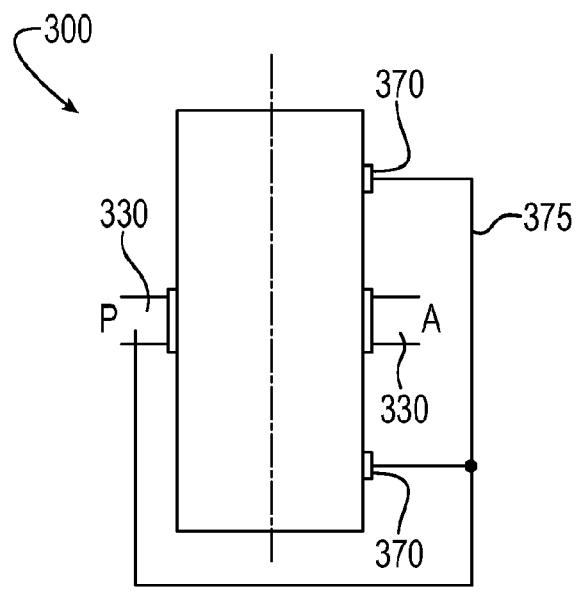
FIG. 3A shows a side view schematic of an exemplary pressure-balanced rotary valve.
Figure 3B:
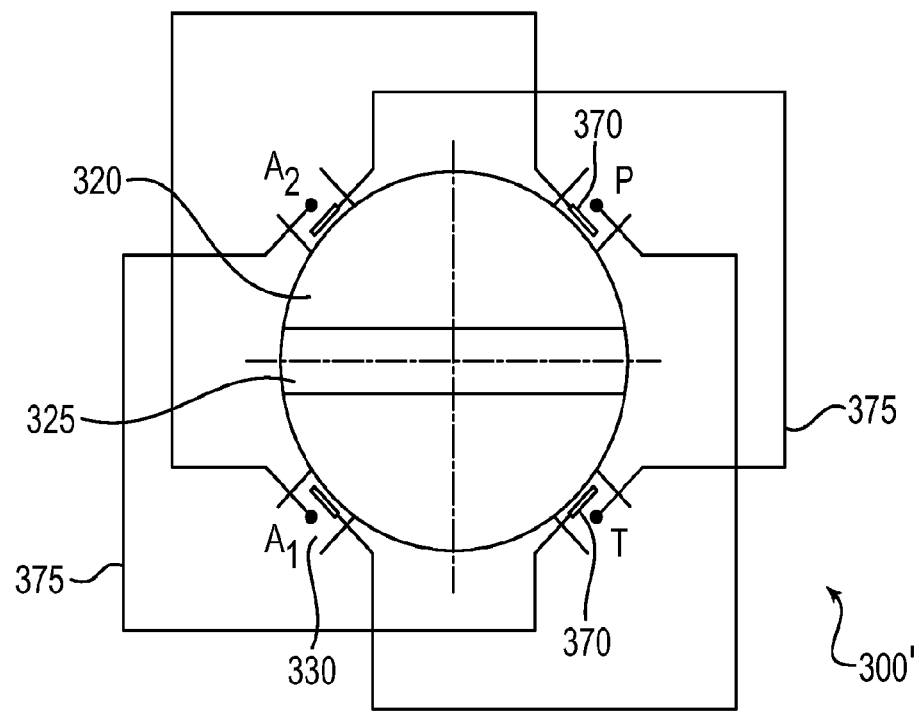
FIG. 3B shows a cross-sectional schematic of another exemplary pressure-balanced rotary valve.
Figure 3C:
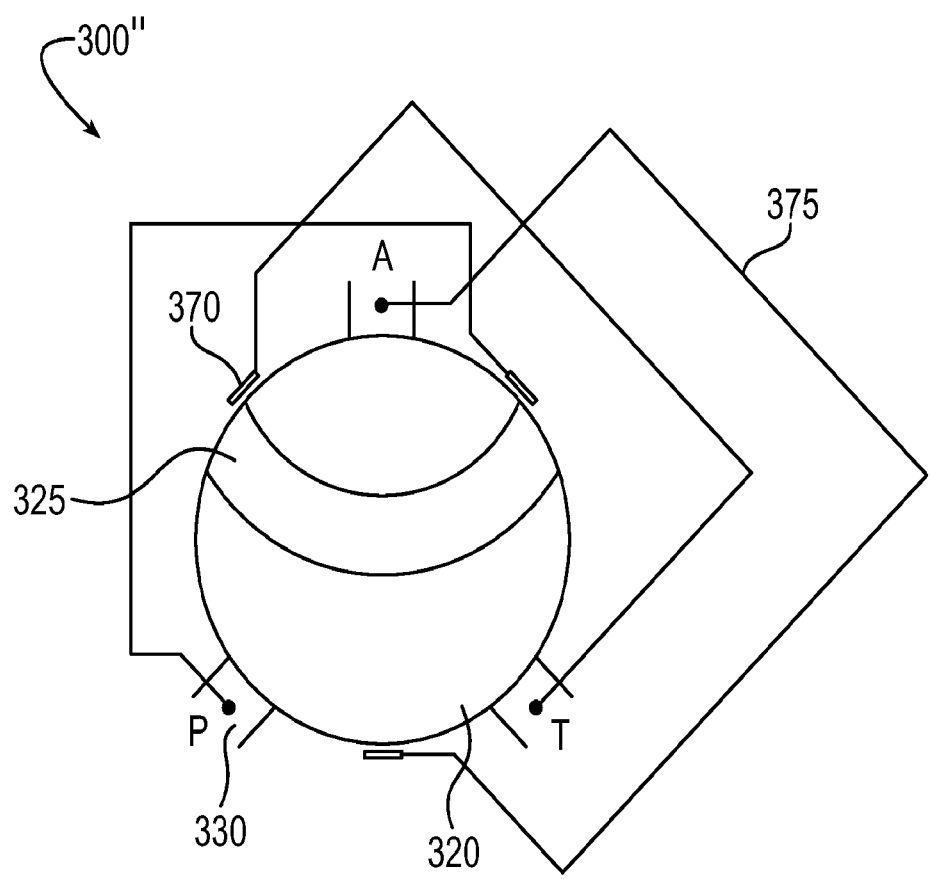
FIG. 3C shows a cross-sectional schematic of yet another exemplary pressure-balanced rotary valve.

FIGS. 3A-3C show rotary valves 300, 300' and 300" which include features that may be selectively incorporated into the other valves described herein in order to result in a pressure-balanced valve. Such a valve would result in significantly reduced transverse forces acting on the rotary spool when under pressure, allowing for significantly fewer/smaller bearings to support the spool in the housing.

As shown, the housing may include one or more balancing ports 370 opening to the cavity 312 at a side of the cavity radially opposite an associated flow port 330. A balancing passageway 375 may communicate fluid pressure from the flow port 330 to the associated balancing port 370.

The location and size of the one or more balancing ports may be adjusted to produce the desired effect. In an exemplary embodiment, the one or more balancing ports 370 are radially opposite the associated flow port 330.

Although the area of any balancing ports may be any desired amount, in an exemplary embodiment, the area is approximately equal to the area of the associated flow port 330. This equivalence in area, combined with an approximate equivalence in pressure, results in an equal and opposite force from the balancing port 370, tending to cancel out the force of the pressure acting on the rotary spool at the associated flow port 330.

Optionally, the housing may include more than one balancing port associated with each flow port. In an exemplary embodiment, the housing includes two balancing ports 370 per associated flow port 330, as is shown in FIG. 3A. The two balancing ports 370 may be directly radially opposite the first flow port and may be axially offset from the associated flow port 330. Being axially offset allows the balancing ports 370 to avoid fluid communication with the fluid passageway 325 of the rotary spool 320. Being of equal total area to each other and of equal axial spacing from the associated flow port 330 makes the net torque about the rotary spool rotation axis on the rotary spool 320 produced by the balancing ports 370 approximately zero. Alternatively, such a result may be achieved through other means, for example by unequal areas and concomitantly unequal spacing, as long as the sum of all the moments produced by the balancing ports disposed about the associated flow ports axis sum to zero.

Figure 4A:
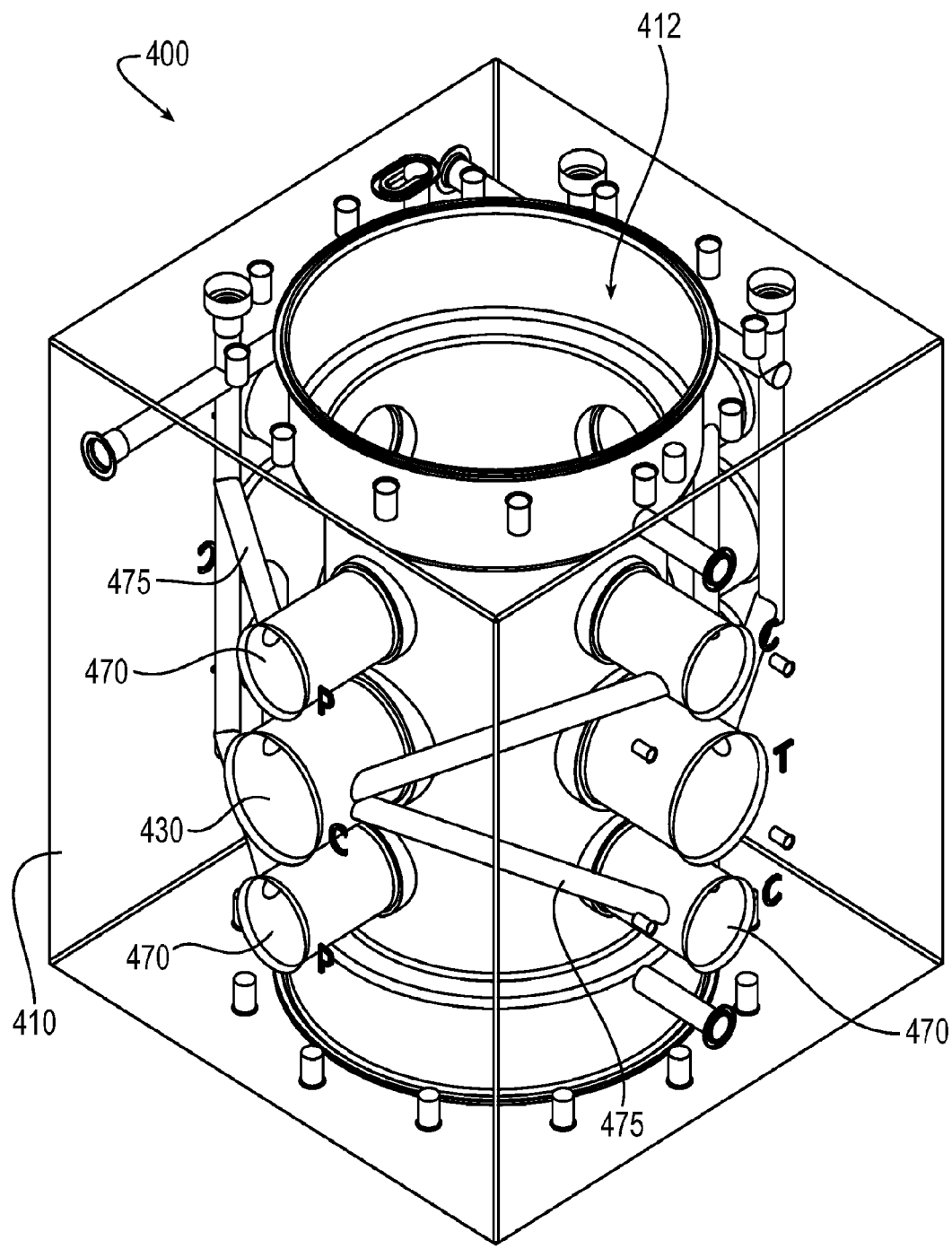
FIG. 4A shows a perspective view of an exemplary pressure-balanced rotary valve with interior housing features visible.
Figure 4B:
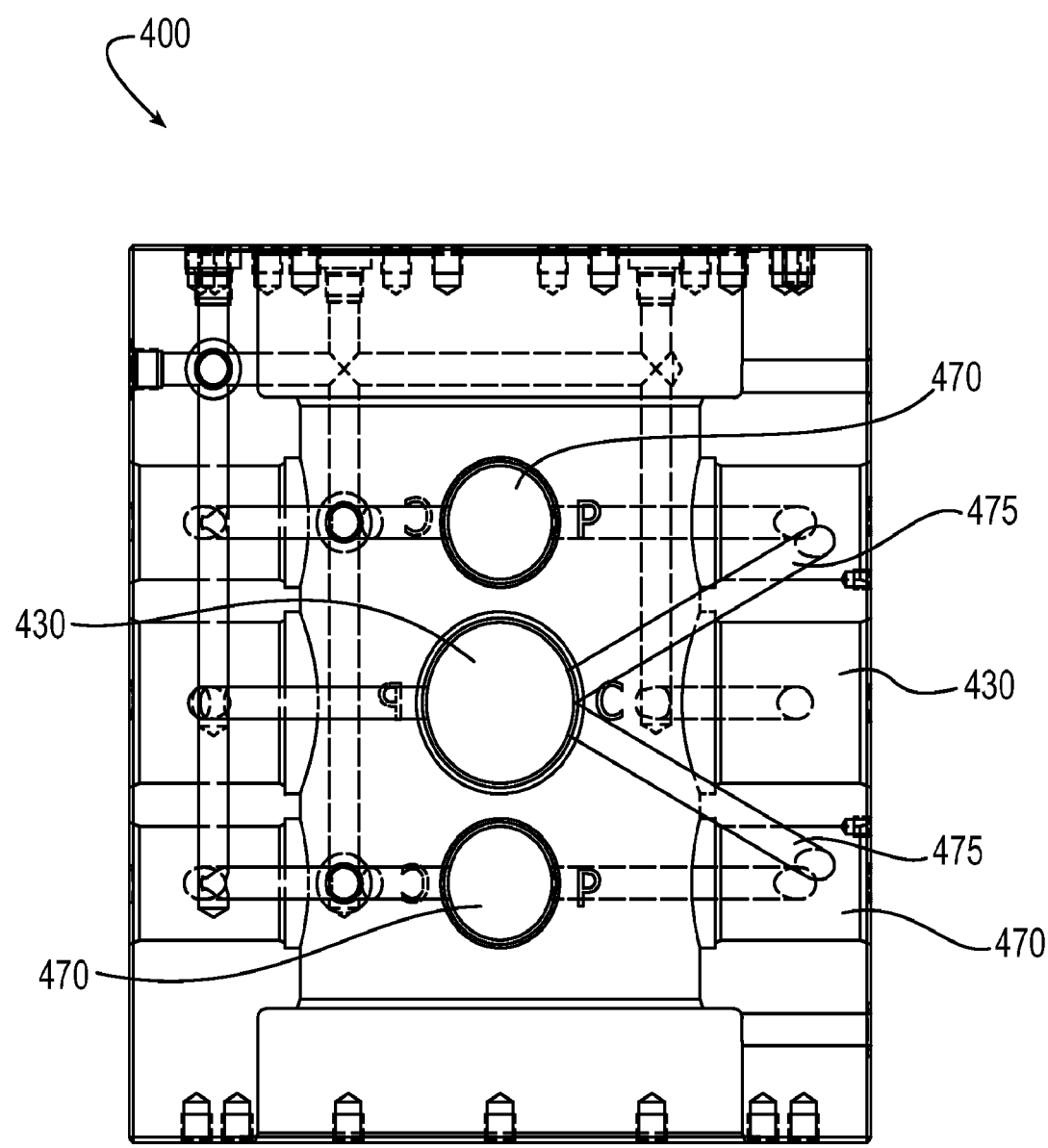
FIG. 4B shows a side view of the exemplary pressure-balanced rotary valve with interior housing features visible.
Figure 4C:
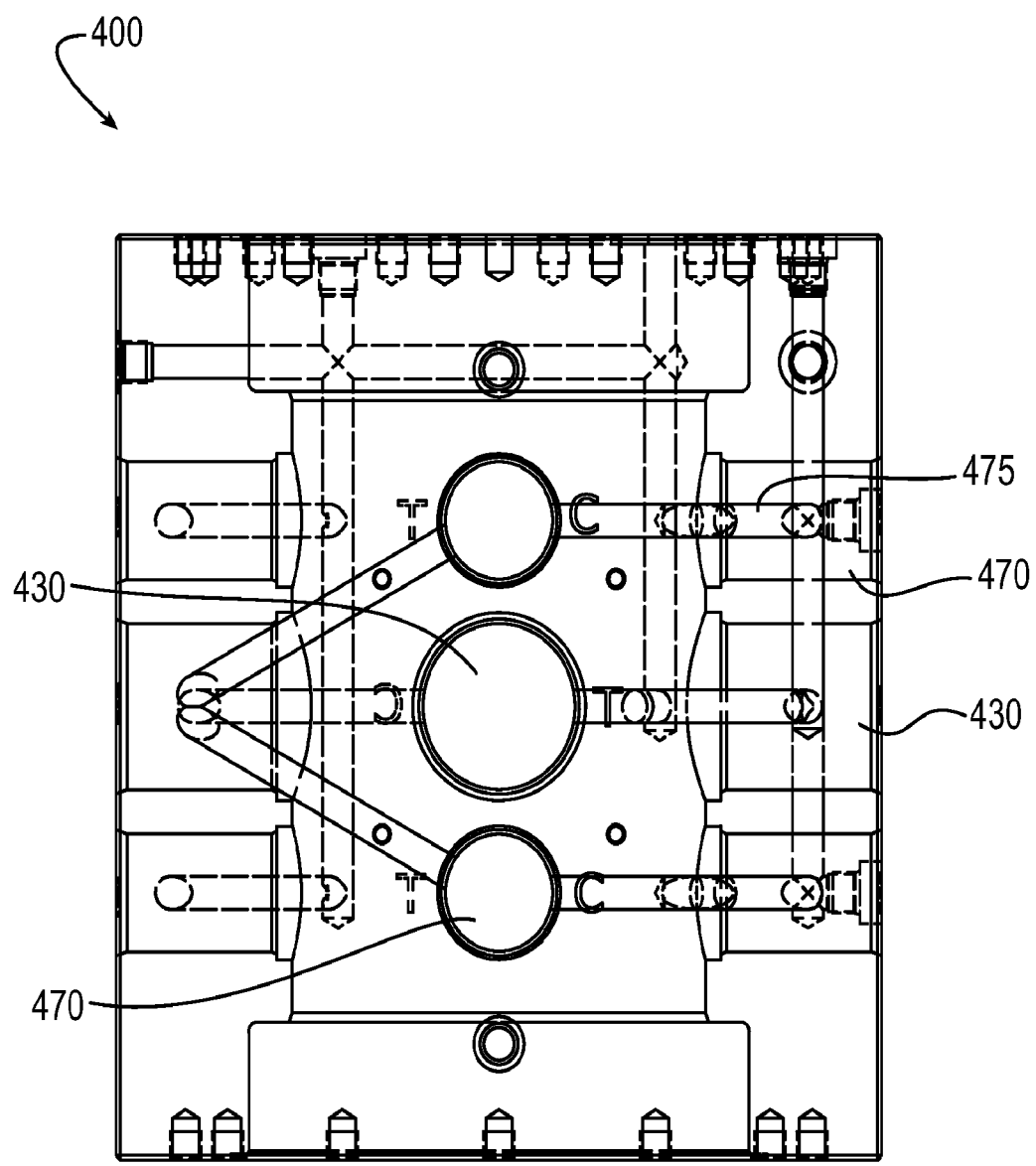
FIG. 4C shows another side view of the exemplary pressure-balanced rotary valve with interior housing features visible.
Figure 5A:
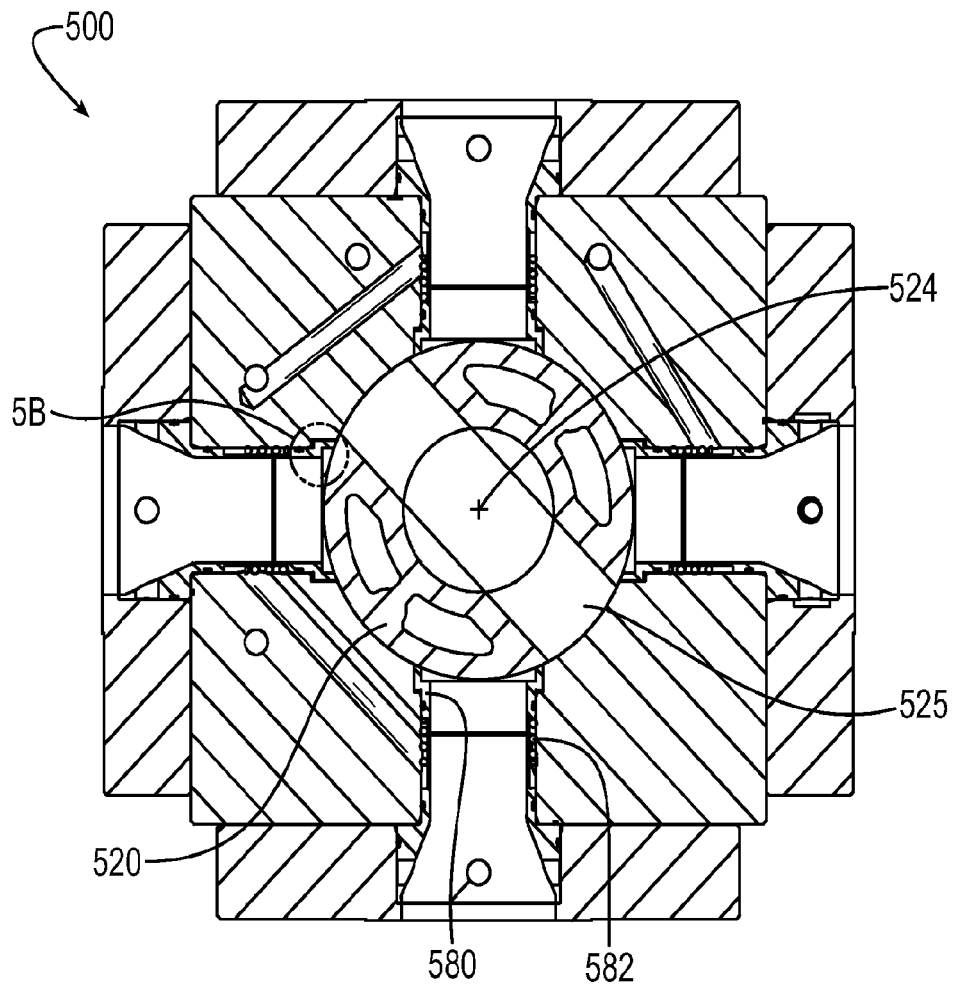
FIG. 5A shows a cross-sectional view of an exemplary rotary valve with pressure balanced port seals.
Figure 5B:
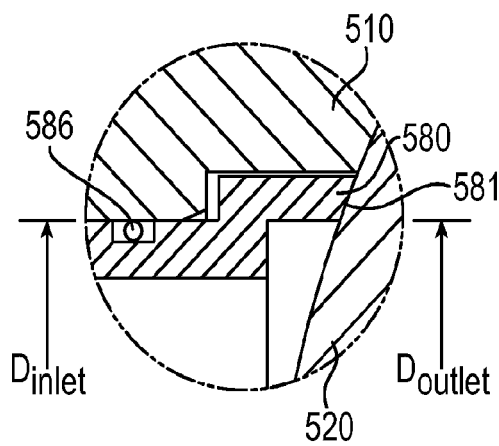
FIG. 5B shows a detail cross-sectional view of an exemplary rotary valve with pressure balanced port seals, detailing a view of a seal sealing to the rotary spool.
Figure 6A:
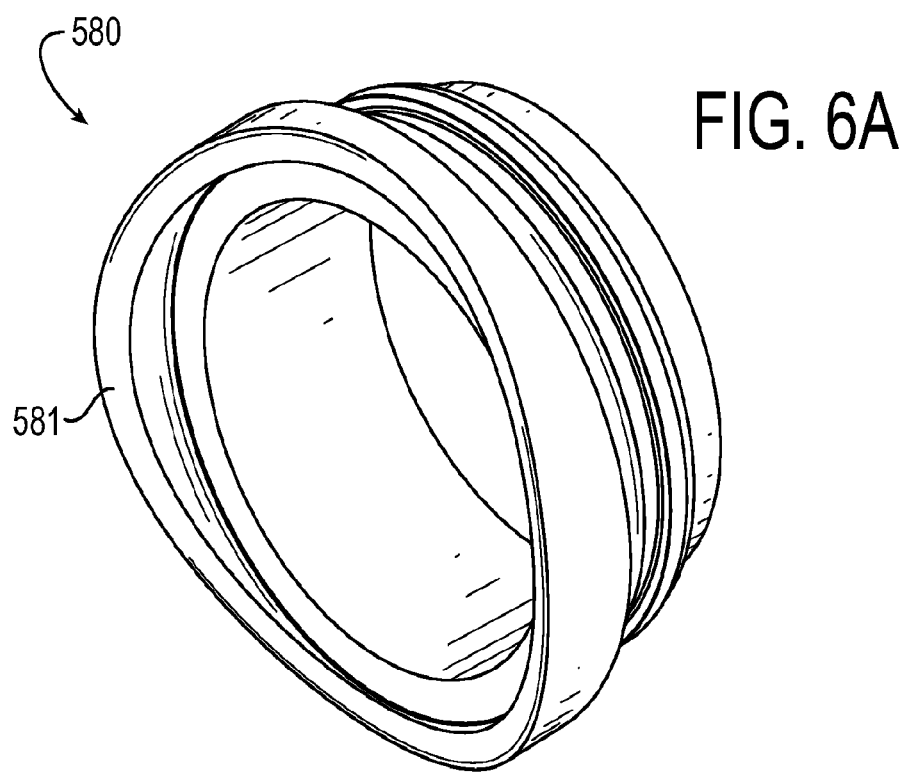
FIG. 6A shows a perspective view of an exemplary pressure balanced port seal.
Figure 6B:
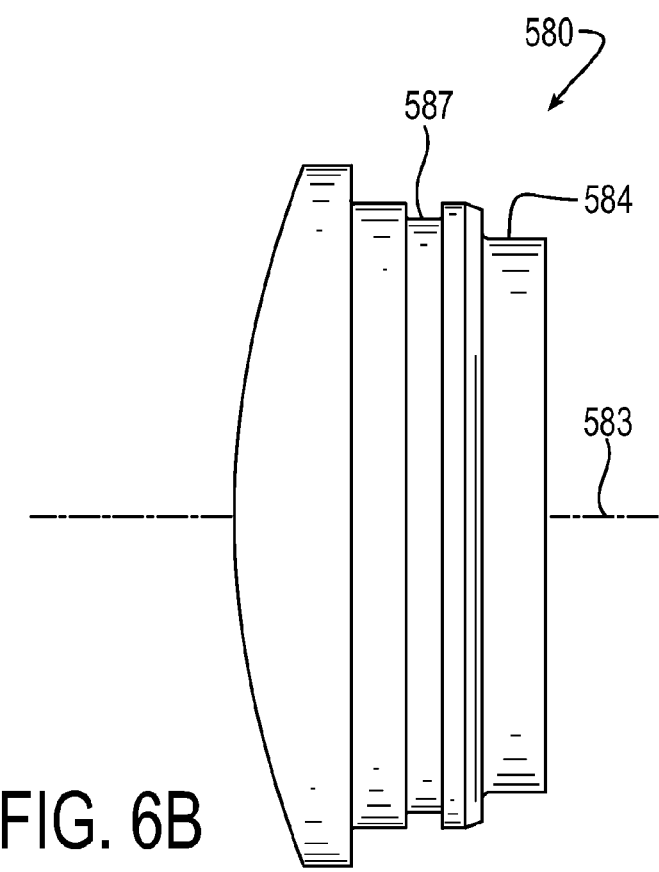
FIG. 6B shows a side view of an exemplary pressure balanced port seal.

The balancing passageway 375 may include porting connected via external connections. Alternatively, the passageway may include one or more channels contained within the housing of the valve, as shown in FIGS. 4A-4C.

As shown, such a balancing system as described above may be applied to variously-configured rotary valves. FIG. 3B shows the system applied to a four port, three position rotary valve in which each of the four flow ports (P, T, A1 and A2) have one or more associated balancing ports, resulting in a fully pressure balanced rotary valve. However, not every flow port needs to be balanced with one or more balancing ports in every application. For example, in some systems, one or more flow ports (e.g., the tank port) may have zero or negligible pressure acting on the rotary spool. Therefore, in such a case, the tank port would not need to be balanced in order to balance the rotary valve as a whole.

In the case where no or minimal clearance is maintained between the rotary spool and the housing, guided or otherwise—where the rotary spool and the housing can come into contact with one another—frictional forces and component wear will be produced. In the case where the rotary spool and the housing's clearance is guided and controlled, the clearance itself may provide an undesirable inter-port leak path and subsequent leakage. In the case where the rotary spool is exposed to unbalanced forces, such as produced by port pressures or other sources, the deflection of the spool will have to be taken into account to provide adequate additional clearance to keep the spool from contacting the housing in use. In this last case the inter-port leakage will be exacerbated. The dimensional control requirements for any of the three cases identified would be critical, and the expense to minimize inter-port leakage and/or unnecessary wear could be unpractical, although such a configuration is still within the scope of this invention and may be employed in some applications.

Referring now to FIGS. 5A, 5B, 6A, and 6B, an exemplary embodiment implements radially disposed floating pressure balanced floating shear seals 580 contained in the housing 510 at each port location. Sealing faces 581 are in contact with the rotating spool 520 and provide a seal between the rotary spool 520 and the stationary housing 510 regardless of the clearance between the two. This reduces the inter-port leakage while allowing a more practical (larger) clearance between the spool and body. This embodiment also allows the rotary spool to be guided by a bearing means maintaining the said practical clearance assuring that the rotor does not contact the housing, thus mitigating the potential for wear between the spool and body.

The floating pressure balanced shear seals 580 are configured in such a way that the differential area across the seal (as radially disposed for the seal face to contact the rotor) is slightly unbalanced to create a bias force, energized by the port pressure, toward the rotary spool 520. For example, the inlet diameter ($D_{inlet}$) of the seal would be slightly larger than the outlet diameter ($D_{outlet}$) of the seal. A spring 582 may optionally be used instead of or in addition to the pressure biasing. The spring 582 rest in a spring groove 584 and may assist by overcoming the seals' diametral o-ring friction when the available port pressure is not high enough to overcome this force. This pressure-energized force unbalance (pressure biasing) in conjunction with the spring should be sufficient to substantially overcome the seals' diametral o-ring friction and assure the seal follows the profile of the rotary spool 520.

The seal imbalance in itself can be of any magnitude. However, larger unbalanced areas will produce significantly higher friction resulting in higher required torque to operate the valve and will produce accelerated wear. In an exemplary embodiment, the floating pressure balanced shear seals 580 are for the most part more balanced than imbalanced, as the intent is to provide only enough reliable force between the individual seals and the rotary spool to ensue enough contact during all operating conditions to assure a good seal while avoiding unnecessary frictional force and subsequent required actuator torque to operate the valve. This 'nearly' balanced feature also minimizes seal and rotary spool wear to levels well below conventional sealing systems and will produce much longer life.

The seals described herein may be, and are herein presented as being, used on either flow ports or balancing ports. The fluid passageway through the seal defines a flow axis 583. In order to properly seal with the outer surface of the rotary spool 520, the sealing face 581 is concave along and concentric with the rotation axis 524 of the rotary spool 520 and is thereby complimentary to the outer radial surface of the rotary spool 520.

Preferably, the seal member 580 is metal or a composite, thus forming a robust (e.g., metal-to-metal) seal with the rotary spool. The durability of a metal seal will allow for significantly reduced maintenance and longer life. Because the seal itself moves little, the seal member 580 may be sealed to the housing along an outer diameter with an O-ring 586 situated in a channel 587.

Although the configuration described herein refers to seal members located in the housing and sealing against the rotary spool, it is contemplated that the seals may also be located in the rotary spool and seal against the inside of the housing.

In any event requiring a failsafe function where any of the described rotary valves is required to fail in an "all ports blocked condition" where the primary actuator cannot be relied upon to produce this result, or in any a condition where the valve actuator is required to be overridden, an integrated 'Failsafe Port Blocker' may be incorporated.

Figure 7A:
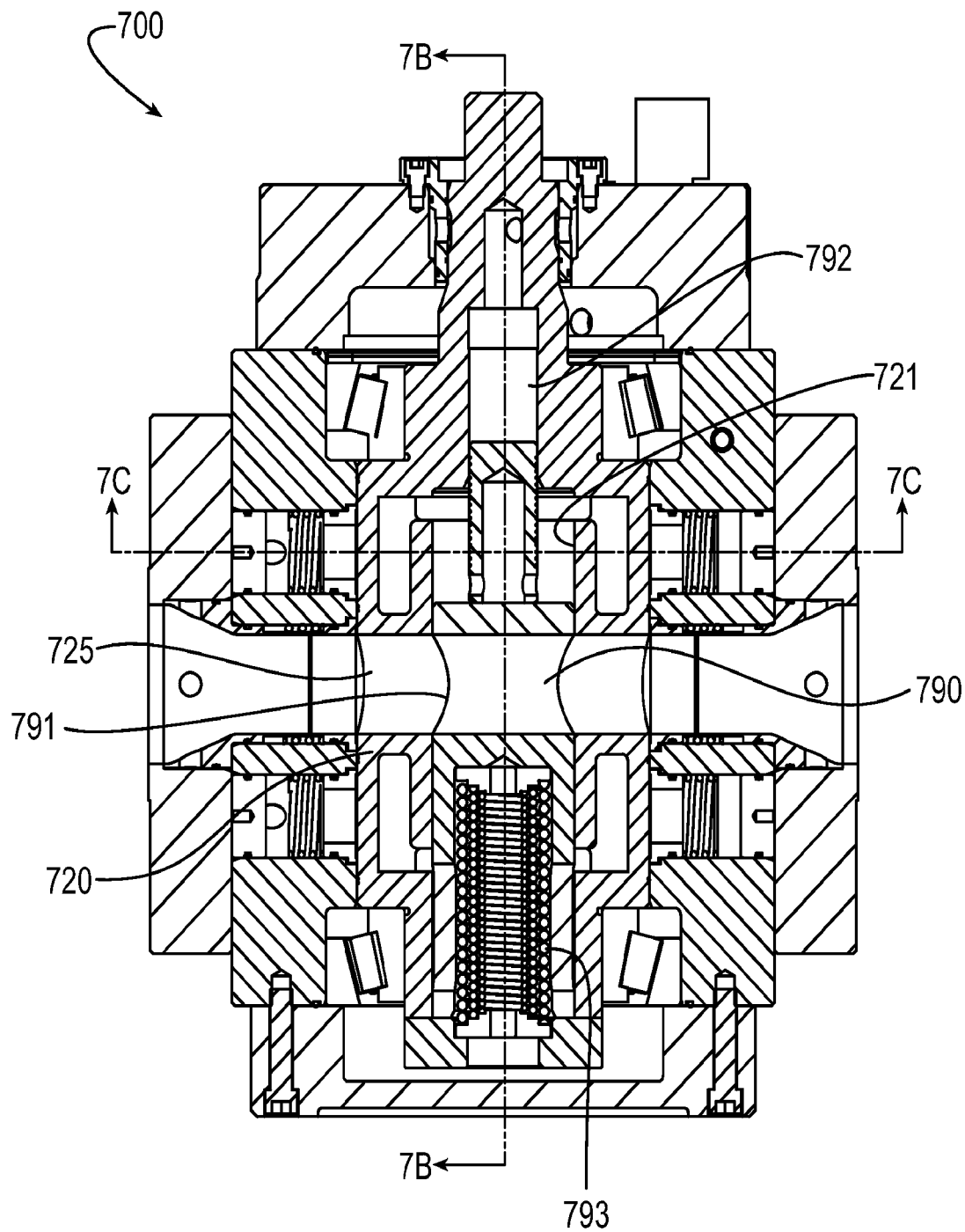
FIG. 7A shows a cross-sectional view of an exemplary rotary valve including a blocking spool.
Figure 7B:
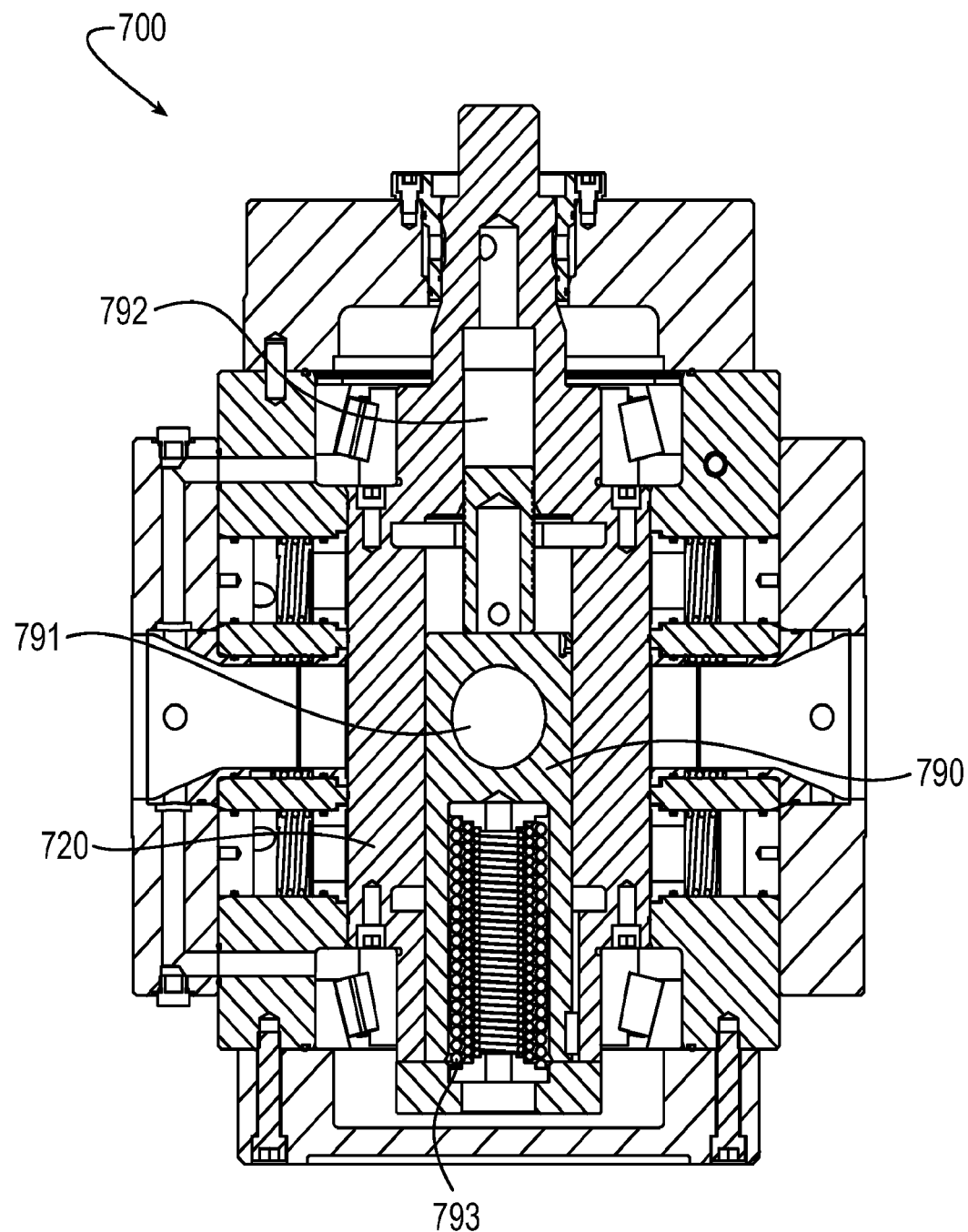
FIG. 7B shows another cross-sectional view of the exemplary rotary valve including a blocking spool.
Figure 7C:
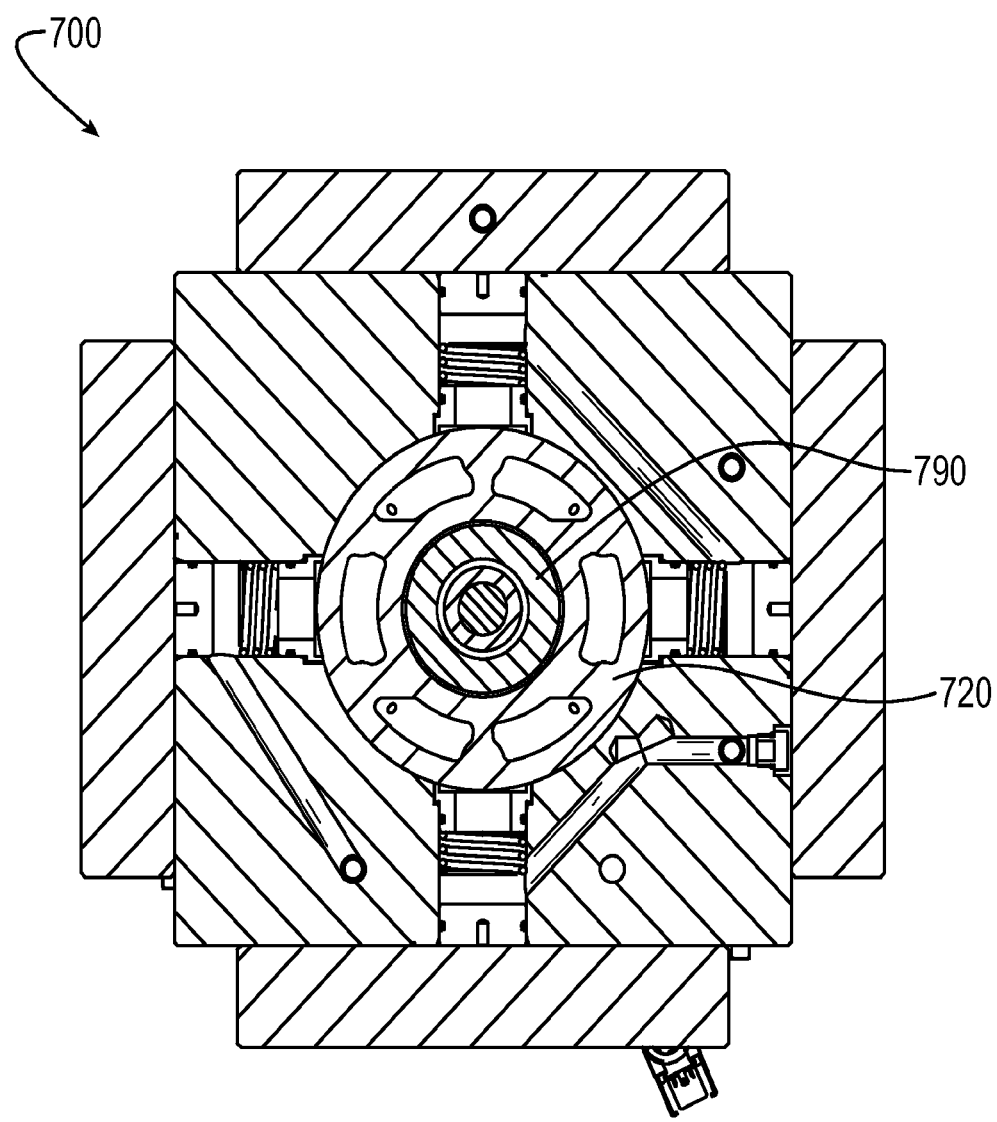
FIG. 7C shows yet another cross-sectional view of the exemplary rotary valve including a blocking spool.

Referring to FIGS. 7A-7C, a second spool or blocking cylinder 790 is included and may optionally be positioned and keyed concentrically within a bore 721 of the rotary spool 720 as shown, where a through passage 791 in the blocking cylinder is aligned with the rotary spool fluid passage 725 under normal conditions.

When the failsafe condition is required, the hydraulic volume 792 holding the blocker in the open position may be allowed to vent to tank and the spring 793 moves the blocker, thus blocking flow through the rotary spool. Regardless of the position of the rotary spool 720 when the failsafe is initiated, all ports will be blocked. Although shown as an axially movable spool 790, the blocker spool may also be implemented in other way, including as a rotary spool, rotatably movable with respect to the rotary spool 720.

During normal operation the valve 700 may be held in the blocked position until the hydraulic operator volume 792 opposing the spring is pressurized and the blocker spool 790 is disabled by moving to the position allowing communication through the rotary spool and blocker spool. As long as the hydraulic operator is pressurized—the blocker function is neutralized. Upon electrical power failure or when a signal to a directional pilot valve solenoid is disconnected, a cartridge valve may vent the hydraulic operator holding the blocker in place and the blocker will move to the blocked position.

This blocking function and the associated fixtures can be performed either integrated in the valve itself or separately plumbed to the rotary valve, or may include a combination of these alternatives. The configuration shown is to illustrate the blocking principle itself and the means for actuation. Several alternate configurations are possible.

Figure 8A:
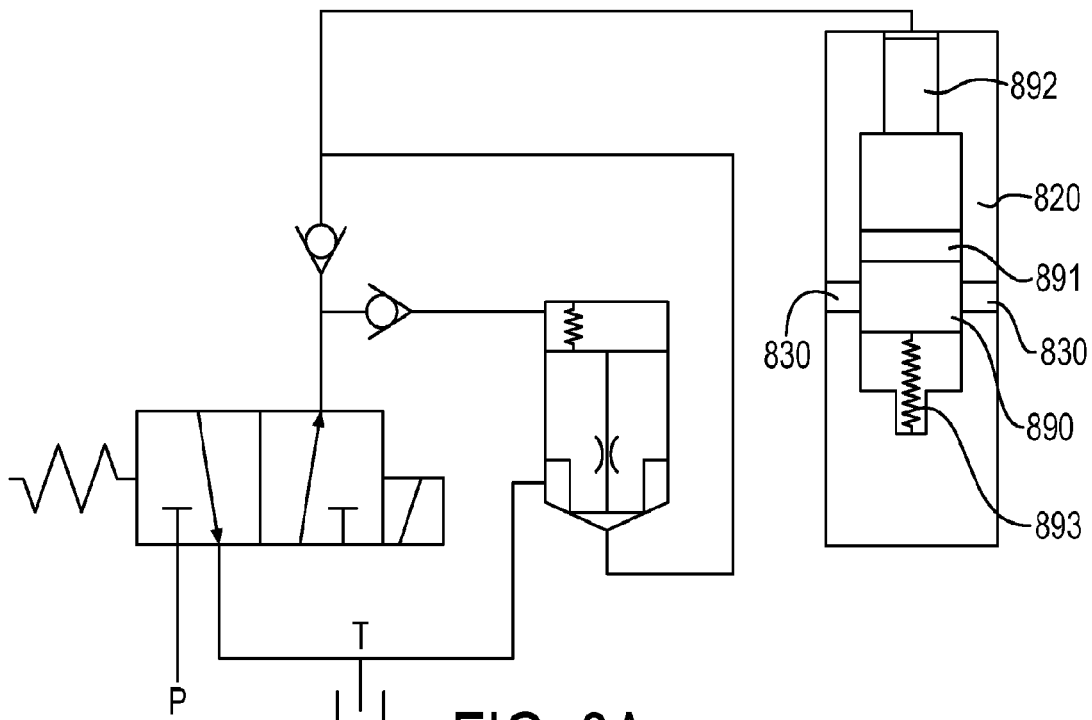
FIG. 8 shows a hydraulic schematic showing the control circuit for operating the blocking spool.
Figure 8B:
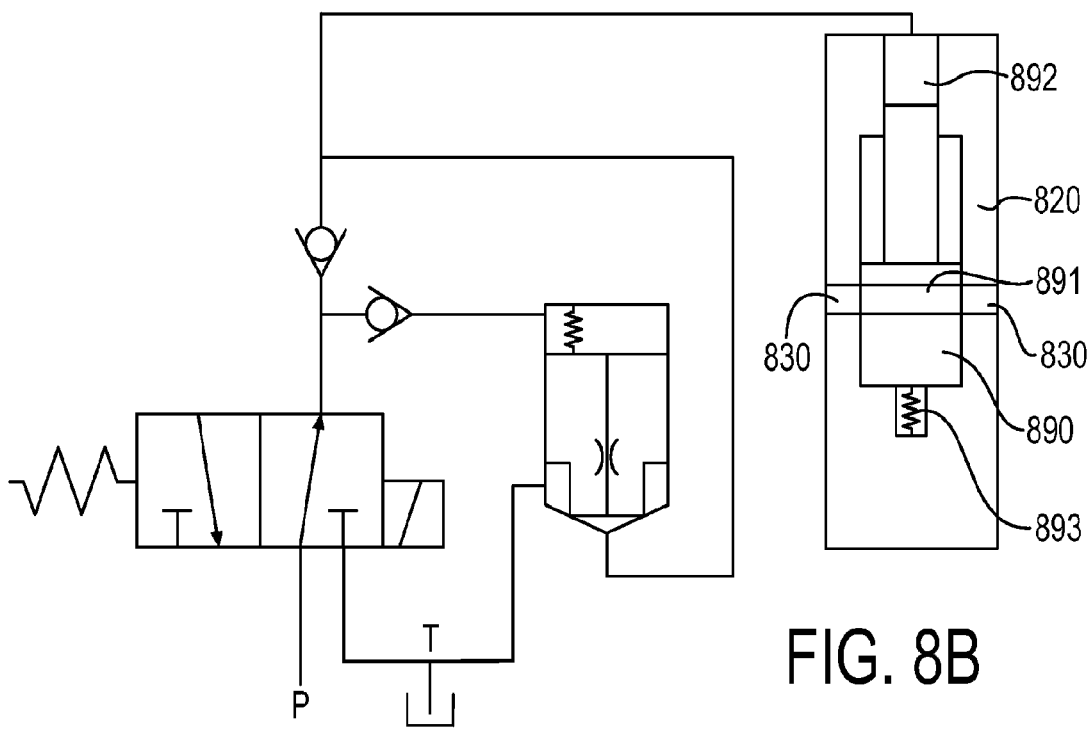

Referring to FIG. 8, starting with the blocker cylinder in the blocked position and with the power to the 'lift' solenoid of the pilot control directional control valve off, the solenoid valve vents the back side of the DIN cartridge valve providing no resistance to flow to the top of the blocker actuator. The blocked actuator remains bottomed out by the blocker spring. To move the blocker to the 'normal' operating (non blocked) position, the 'lift' solenoid is energized, moving the spool connecting supply pressure to the blocker actuator, which moves the blocker against the spring until the blocker actuator bottoms, thus positioning the blocker in the 'normal' unblocked position. As long as the 'lift' solenoid is energized, the blocker remains in the 'normal' unblocked position. Upon a power or hydraulic supply failure the pilot control directional valve will spring activate the spool to the position where the supply pressure port will be blocked, and the back side of the DIN cartridge valve will vent to tank, allowing the stored hydraulic pressure in the blocker actuator to flow through the nose of the DIN cartridge valve to tank, thus positioning the blocker in the 'blocked' position.

In addition to acting only or primarily as a failsafe blocking spool, the second spool may respond to a modulating signal and be used to regulate the amount of fluid flowing through the rotary spool when the rotary spool is in an open position.

When used in large applications, the force required to actuate the rotary spool of the valve may become restrictive. Therefore, in order to provide an adequate flow in a relatively small package, any of the rotary valves described herein may be modified into a stacked arrangement with coupled or shared rotary spools.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rotary valve comprising:
a housing having a cavity;
a rotary spool positioned within and rotatably movable in the cavity of the housing about a rotation axis, the spool having a fluid passageway extending through the spool between first and second openings at an outer radial surface of the spool;
wherein the housing has four flow ports including first and second flow ports opening to the cavity at radially spaced apart locations that respectively will align with the first and second openings at the outer radial surface of the spool at a first rotated position of the rotary spool, a first balancing port opening to the cavity at a side of the cavity radially opposite the first flow port, and a balancing passageway outside of the valve spool for communicating fluid pressure from the first flow port to the first balancing port,
wherein the rotary spool is moveable to a first position to create a fluid passageway between the first flow port and the second flow port, a second position to create a fluid passageway between a third flow port and a fourth flow port, and a third position blocking flow through the valve,
wherein the housing includes a second balancing port opening to the cavity at a side of the cavity radially opposite the first flow port and a balancing passageway outside of the valve spool for communicating fluid pressure from the first flow port to the second balancing port, and
wherein the first and second balancing ports are axially offset from the first flow port and have a combined opening area approximately equal to the opening area of the first flow port, thereby reducing net torque applied to the rotary spool when pressurized.

2. The rotary valve of claim 1, wherein the balancing ports are formed perpendicular to the outer radial surface of the spool.

3. The rotary valve of claim 1, wherein the first and second opening of the rotary spool are radially opposite each other.

4. The rotary valve of claim 1, wherein the first balancing port is directly opposite the first flow port in a radial direction.

5. The rotary valve of claim 1, wherein the flow ports are formed perpendicular to a central axis of the cylindrical cavity.

6. The rotary valve of claim 1, wherein the balancing passageway is contained within the housing and fluidly connects the first flow port to the first balancing port.

7. The rotary valve of claim 1 further comprising:
a pressure balanced or nearly pressure balanced seal member having a fluid passageway along a flow axis, the seal member coaxial with and disposed in the first flow port and having a sealing face for sealing against the rotary spool,
wherein the sealing face is concave along and concentric with the rotation axis of the rotary spool and thereby complimentary to the outer radial surface of the rotary spool.

8. The rotary valve of claim 7, wherein the seal member floats with respect to the housing.

9. The rotary valve of claim 7, wherein the seal member is configured to produce a biasing force in a direction towards the sealing face when subject to pressurized fluid.

10. The rotary valve of claim 7, wherein the seal member and the rotary spool form a metal-to-metal seal.

11. The rotary valve of claim 7, wherein the rotary valve further includes a second seal member having a fluid passageway along a flow axis, the second seal member coaxial with and disposed in the first balancing port and having a sealing face for sealing against the rotary spool;
wherein the sealing face is concave along and concentric with the rotation axis of the rotary spool and thereby complimentary to the outer radial surface of the rotary spool.

12. The rotary valve of claim 11,
wherein the rotary valve further includes a third seal member having a fluid passageway along a flow axis, the third seal member coaxial with and disposed in the second balancing port and having a sealing face for sealing against the rotary spool;
wherein the sealing face is concave along and concentric with the rotation axis of the rotary spool and thereby complimentary to the outer radial surface of the rotary spool.

13. The rotary valve of claim 7, wherein the seal is pressure balanced.

14. The rotary valve of claim 7, further comprising a biasing element configured to bias the seal member in a direction towards the sealing face.

15. The rotary valve of claim 7, wherein the inlet diameter of the seal is approximately equal to the outlet diameter of the seal.

16. The rotary valve of claim 7, wherein the inlet diameter of the seal is slightly larger than the outlet diameter of the seal.

17. A rotary valve comprising:
a housing having a cavity;
a rotary spool positioned within and rotatably movable in the cavity of the housing about a rotation axis, the spool having a fluid passageway extending through the spool between first and second openings at an outer radial surface of the spool;
wherein the housing includes first, second, third, and fourth flow ports opening to the cavity at radially spaced apart locations, and
wherein the rotary spool is movable between three positions, and wherein, in the first position, the rotary spool connects the first and second flow ports and connects the third and fourth flow ports, in the second position, the rotary spool connects the second and third flow ports and connects the first and fourth flow ports, and in the third position, the rotary spool disconnects the flow ports from each other, and
wherein each flow port is fluidly connected outside of the rotary spool to a respective axially offset pair of pressure balancing ports radially opposite their respective flow port.

18. A rotary valve comprising:
a housing having a cavity;
a rotary spool positioned within and rotatably movable in the cavity of the housing about a rotation axis, the spool having a fluid passageway extending through the spool between first and second openings at an outer radial surface of the spool, wherein the housing includes first and second flow ports opening to the cavity at radially spaced apart locations that respectively will align with the first and second openings at the outer radial surface of the spool at a first rotated position of the rotary spool, a first balancing port opening to the cavity at a side of the cavity radially opposite the first flow port, and a balancing passageway outside of the valve spool for communicating fluid pressure from the first flow port to the first balancing port; and
a pressure balanced or nearly pressure balanced seal member having a fluid passageway along a flow axis, the seal member coaxial with and disposed in the first flow port and having a sealing face for sealing against the rotary spool, wherein the sealing face is concave along and concentric with the rotation axis of the rotary spool and thereby complimentary to the outer radial surface of the rotary spool, wherein the seal member and the rotary spool form a metal-to-metal seal;
wherein the housing includes a second balancing port opening to the cavity at a side of the cavity radially opposite the first flow port and a balancing passageway outside of the valve spool for communicating fluid pressure from the first flow port to the second balancing port; and wherein the first and second balancing ports are axially offset from the first flow port and have a combined opening area approximately equal to the opening area of the first flow port, thereby reducing net torque applied to the rotary spool when pressurized.

19. A rotary valve comprising:

a housing having a cavity;

a rotary spool positioned within and rotatably movable in the cavity of the housing about a rotation axis, the spool having a fluid passageway extending through the spool between first and second openings at an outer radial surface of the spool, wherein the housing includes first and second flow ports opening to the cavity at radially spaced apart locations that respectively will align with the first and second openings at the outer radial surface of the spool at a first rotated position of the rotary spool, a first balancing port opening to the cavity at a side of the cavity radially opposite the first flow port, and a balancing passageway outside of the valve spool for communicating fluid pressure from the first flow port to the first balancing port;

a pressure balanced or nearly pressure balanced seal member having a fluid passageway along a flow axis, the seal member coaxial with and disposed in the first flow port and having a sealing face for sealing against the rotary spool, wherein the sealing face is concave along and concentric with the rotation axis of the rotary spool and thereby complimentary to the outer radial surface of the rotary spool; and a second seal member having a fluid passageway along a flow axis, the second seal member coaxial with and disposed in the first balancing port and having a sealing face for sealing against the rotary spool, wherein the sealing face is concave along and concentric with the rotation axis of the rotary spool and thereby complimentary to the outer radial surface of the rotary spool, wherein the housing includes a second balancing port opening to the cavity at a side of the cavity radially opposite the first flow port and a balancing passageway outside of the valve spool for communicating fluid pressure from the first flow port to the second balancing port; and wherein the first and second balancing ports are axially offset from the first flow port and have a combined opening area approximately equal to the opening area of the first flow port, thereby reducing net torque applied to the rotary spool when pressurized.

20. The rotary valve of claim 19, wherein the rotary valve further includes a third seal member having a fluid passageway along a flow axis, the third seal member coaxial with and disposed in the second balancing port and having a sealing face for sealing against the rotary spool;

wherein the sealing face is concave along and concentric with the rotation axis of the rotary spool and thereby complimentary to the outer radial surface of the rotary spool.

* * * * *